May 26, 1970 A. O. CHRISTENSEN 3,514,765

SENSE AMPLIFIER COMPRISING CROSS COUPLED MOSFET'S OPERATING IN A RACE MODE FOR SINGLE DEVICE PER BIT MOSFET MEMORIES

Filed May 23, 1969

INVENTOR.
ALTON O. CHRISTENSEN
BY
Mellin, Moore + Weissenberger
ATTORNEYS

United States Patent Office 3,514,765
Patented May 26, 1970

3,514,765

SENSE AMPLIFIER COMPRISING CROSS COUPLED MOSFET'S OPERATING IN A RACE MODE FOR SINGLE DEVICE PER BIT MOSFET MEMORIES

Alton O. Christensen, Houston, Tex., assignor to Shell Oil Company, New York, N.Y., a corporation of Delaware Filed May 23, 1969, Ser. No. 827,193
Int. Cl. G11c *11/24, 11/40*
U.S. Cl. 340—173 14 Claims

ABSTRACT OF THE DISCLOSURE

A highly efficient sense amplifier for metal oxide silicon chip memory arrays can be built by using a pair of cross-coupled sensing MOSFET's connected in a racing mode between a bit line capacitance and a precharge storage capacitance to produce a full-"1" or full-"0" bit line condition responsive to the capacitive information charge stored in an addressed bit, and transferred to the bit line which condition can serve both as a restoring signal and as a readout signal. Bit line capacitance can be reduced; and a separate precharge storage capacitance eliminated, by connecting each of the cross-coupled MOSFET's to half of the bit line, and using the line capacitance of the idle half of the bit line as the precharge storage capacitance.

BACKGROUND OF THE INVENTION

This invention relates to the single device per bit metal oxide silicon chip memory disclosed in the copending application Ser. No. 825,257, filed May 16, 1969, entitled Single Rail MOSFET Memory With Capacitive Storage. In that application, a single device per bit metal oxide silicon field effect transistor (MOSFET) memory is disclosed in which informational charge increments are transferred between the cell capacitance of an addressed memory cell and a bit line capacitance, and reading, writing, and restoring is done by conventional external means. It is of course highly desirable to incorporate the reading, writing, and restoring circuitry on the memory chip itsself, and it is further desirable to make the read amplifier as insensitive as possible to variations in the absolute bit line voltage or in the informational charge increments impressed on the bit line, or to parameter variations between individual MOSFET's on the chip.

SUMMARY OF THE INVENTION

The present invention provides a solution to the aforesaid problem by providing a MOSFET read-write-restore circuit capable of being formed on the memory chip itself and using a pair of cross-coupled MOSFET's connected in a racing mode between a precharge capacitance and the bit line capacitance to transform a small bit line voltage variation resulting from a charge transfer into a full-"1" or full-"0" data output and restoration signal, regardless of the absolute values of the voltages involved.

The circuit of this invention has the further advantage over the circuit of the prior application that the write time of the cycle precedes the read time, and that it is consequently possible to perform a writing and reading operation on a given cell in the same cycle.

Furthermore, in accordance with a further aspect of this invention, the bit line capacitance (which should be as small as practically possible) can be cut in half by splitting the bit line in two and selectively addressing one or the other half of the bit line. This system has the further advantage of dispensing with the necessity for a separate precharge capacitance, as the bit line capacitance of the idle bit line half can be used as the precharge capacitance.

Finally, the invention makes it practical to use a separate read-write-restore circuit for each column of the memory array, so that the entire memory can be exercised by exercising each row once in sequence. In a typical 1024-bit MOSFET memory, in which each bit needs to be exercised at least once every millisecond, the 32-volt refresh sequence (which represents wasted working time) is a considerable improvement over the 256-cycle refresh sequence of the copending application.

It is therefore the object of the invention to provide a read-write-restore circuit suitable for incorporation in a single-device-per-bit MOSFET memory chip.

It is a further object of the invention to provide a circuit of the type described which translates even the minutest voltage increment in the bit line as a result of information transfer into a full-"1" or full-"0" output.

It is yet another object of the invention to provide a circuit of the type described which automatically restores during each cycle all bits which have the same X address as the addressed bit.

It is another object of the invention to provide means for charging output line capacitance by reading during the time that a clock can provide a low impedance charging source.

It is still another object of the invention to provide a circuit of the type described in which writing and reading can be accomplished on an addressed bit in the same cycle.

DESCRIPTION OF THE PREFERRED EMBODIMENT

A standard 1024-bit random access memory is typically arranged in a square array of 32 columns by 32 rows. Each column is identified by a specific X address, and each row is identified by a specific Y address.

Figure 1:
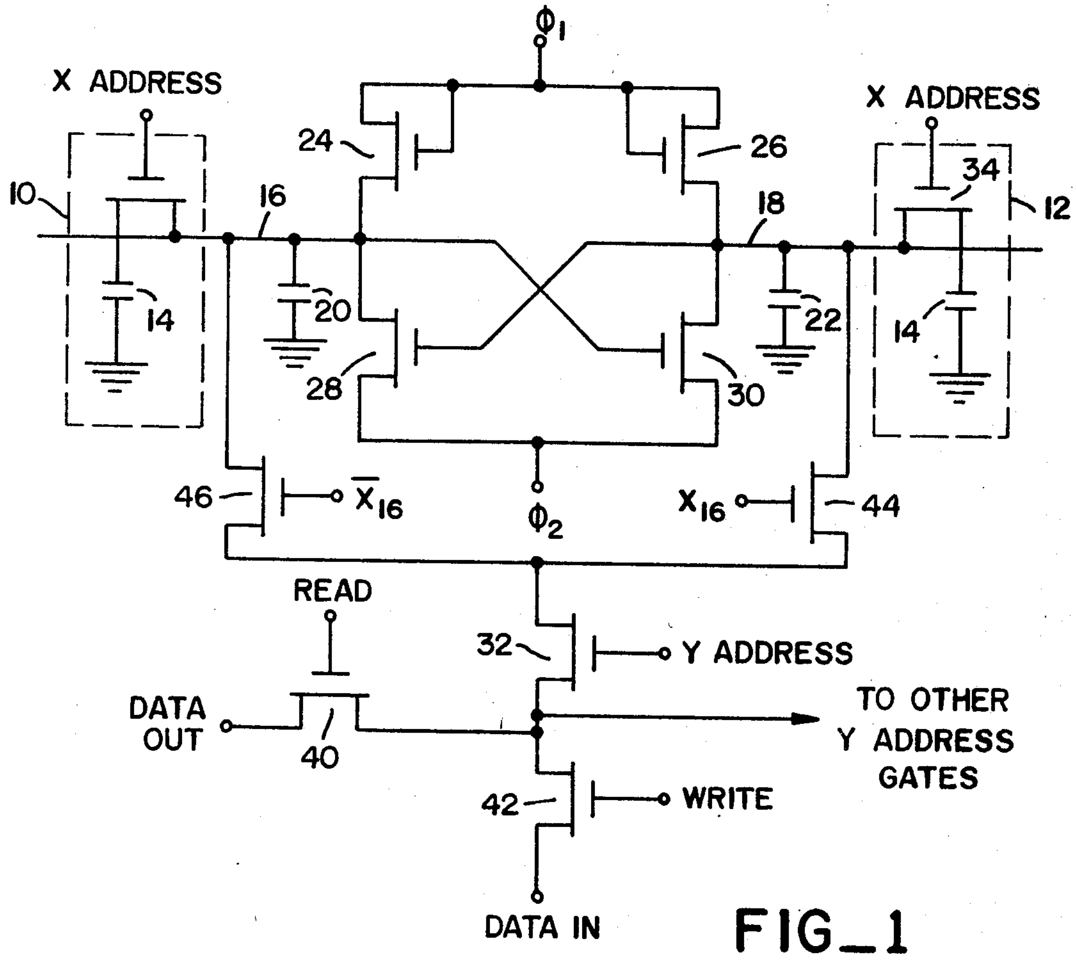
FIG. 1 is a fragmentary circuit diagram showing the device of this invention and its relation to a single-bit-per-device MOSFET memory.

In FIG. 1 the reference numeral 10 designates one of sixteen memory cells which make up the left half of a given row of such an array. Each cell represents one bit of information. These memory cells, of which only one is shown for clarity, all have a common Y address but different X addresses, and the information therein, represented by the charge on internal capacitance 14, is transferred to the common bit line half 16 when the cell is addressed by a coincidence of the proper X and Y addresses.

The reference numeral 12 designates one of the other sixteen cells with the same Y address as the previously mentioned cells. The information stored in the internal capacitance 14 of an addressed one of the cells represented by cell 12 is transferred to the common bit line half 18. It will be seen that this arrangement divides the bit line for a given Y address into two halves 16, 18 for a purpose hereinafter described, and that the bit line capacitance is thus also divided into two halves 20, 22.

Figure 2:
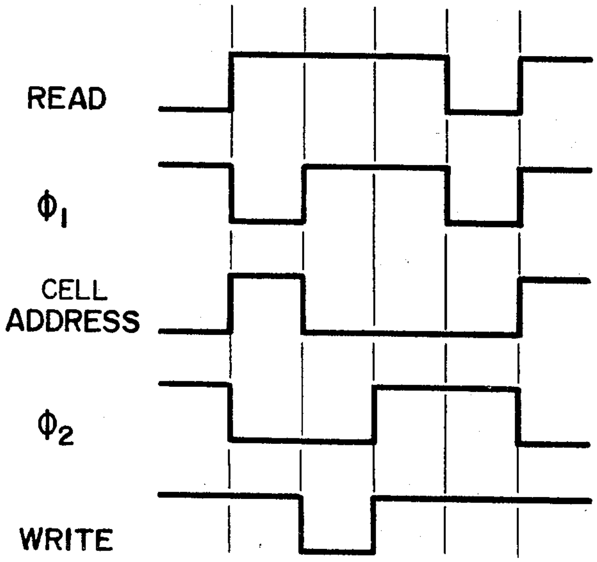
FIG. 2 is the timing diagram for the circuit of FIG. 1.

The nature and operation of the device of this invention is best understood by following an operational cycle of the timing diagram shown in FIG. 2. At the beginning of the cycle, one of the bit line capacitances 20, 22 is at ground, and the other at logic "1" from the previous cycle. Consequently, one of the MOSFET's 28, 30 is enabled, and the other is blocked. Let us assume that 20 is at ground and that 22 is at logic "1."

The initiation of the clock pulse $\phi_1$ now enables MOSFET's 24 and 26, and the simultaneous initiation of $\phi_2$ applies logic "1" to the common connection of MOSFET's 28 and 30. The application of logic "1" to bit line half 16 simultaneously through both of the enabled MOSFET's 24, 28 rapidly charges capacitance 20 to a full "1" level of, for example, about 8 volts. The impression of a "1" on bit line half 16 enables MOSFET 30, and the circuit is now ready to receive information.

Following the cessation of the $\phi_1$ pulse, the circuit is addressed with the gates of both MOSFET's 28 and 30 at logic "1." For the purposes of this description, let it be assumed that the address selected is the address of cell 12. The address pulse (FIG. 2) enables MOSFET's 32 and 34, the former being responsive to the Y portion, only during the time that data is to be written into or read from cell 12 and the latter to the X portion of the address cell 12. The enabling of MOSFET 34 causes capacitor 14 to be connected to bit line half 18. Assuming that the information stored in cell 12 from a prior write time is a "0" (i.e. no charge on capacitance 14 of cell 12), capacitance 14 is charged by the much larger bit line capacitance 22. As a result, the line voltage in bit line half 18, and hence the potential applied to the gate of MOSFET 28, will decrease slightly. It will be seen that the advantage of splitting the bit line into two halves 16, 18 is the reduction of the bit line capacitance from which the capacitance 14 draws its charge, and a consequent increase in the potential difference applied to the gate of MOSFET 28.

Had the information in cell 12 been a "1," no charge transfer would have taken place between line capacitance 22 and cell capacitance 14 of cell 12. However, the total capacitance charged to the "1" level in bit line half 18 (cell capacitance 14 plus line capacitance 22 plus the gate capacitance of MOSFET 28) is greater than the "1"-charged capacitance in bit line half 16 (line capacitance 20 plus gate capacitance of MOSFET 28).

Immediately upon the cessation of the $\phi_2$ pulse MOSFET's 24 and 26 cease conducting, and bit line halves 16, 18 are connected to ground through MOSFET's 28 and 30 respectively. MOSFET's 28 and 30 are now connected in a "race" mode, i.e. they both discharge their gate capacitances to ground level until one of them reaches the threshold voltage. The additional on time $\phi_2$ in excess of $\phi_1$ allows charge transfer between capacitors 14 and 20 or 22 before the "race" begins. The first MOSFET to reach threshold voltage ceases to conduct and prevents further discharge of the gate of the opposing MOSFET. Consequently, the opposing MOSFET continues to conduct until the gate capacitance of the first MOSFET is completely discharged to ground.

Thus, if the line voltage on bit line half 18 is lower than that on bit line half 16 (a "0" readout from cell 12), the gate of MOSFET 28 starts closer to threshold and reaches threshold first. On the other hand, if the line voltages are equal (a "1" readout from cell 12), the slower discharge rate of bit line half 18, due to the total capacitance on that side being larger than that on the side of bit line half 16, causes the gate of MOSFET 30 to reach the threshold voltage first. Consequently, if cell 12 holds a "1" when addressed, bit line half 18 remains at a threshold voltage level, whereas bit line half 16 continues to discharge and eventually reaches ground level.

When the second $\phi_1$ pulse now occurs, MOSFET 30 is blocked, and line capacitance 22 is recharged to a full "1" level through MOSFET 26. The potential in bit line half 16 also rises, the absence of a $\phi_2$ pulse at this time causes a voltage divider action through MOSFET's 24 and 28.

MOSFET's 24, 28 (and 26, 30) may be so proportioned with respect to one another that the potential of bit line half 16 is kept below threshold regardless of the duration of the $\phi_1$; or else they may all be equal, and the duration of the $\phi_1$ pulse may be kept short enough to prevent the potential of bit line half 16 from reaching threshold. During the second $\phi_1$, cells of the array may be read by enabling selection gates 32, 44 (or 46) and 40.

Following the end of the second $\phi_1$ pulse, MOSFET's 24, 26 are blocked, and bit line half 16 discharges back to ground level through MOSFET 28. Bit line half 18 remains at logic "1" because MOSFET 30 is blocked.

Writing is accomplished by enabling the write gate 42, the Y address gate 32 and $X_{16}$ gate 44 during the write pulse in the presence of input data. The low impedance input data easily overrides the effect of cell capacitance 14 on the line voltage, and the input data is thus substituted for the data stored in cell 12. It should be noted that the write pulse occurs before the read pulse, and it is therefore possible to write, and to read the just written data, in the same operational cycle.

Inasmuch as the cell capacitance 14 of cell 12 remains connected to bit line half 18 throughout the address pulse, it follows the line voltage changes in bit line half 18. At the end of the address pulse, the cell capacitance 14 is therefore in a restored (or newly written) full "1" or full "0" condition.

It will be noted that if the X portion of the address of cell 12 is present during the address pulse, cell 12 will go through a destroy-and-restore cycle of information transfer even though the absence of the Y portion of the address prevents reading or writing. Consequently, all cells with a given X address are exercised each time any one of them is exercised.

Inasmuch as the charges on the cell capacitances 14 tend to gradually leak off, it is necessary to periodically (about once every millisecond) refresh the information stored in the bits of non-addressed columns. This can be accomplished by providing a cycle counter (not shown) driven by, e.g., the $\phi_2$ pulses, which periodically interrupts the pulses, which periodically interrupts the random operation of the array and exercises all X addresses in sequence without reading or writing. For a 1024-bit array in a 32 x 32 bit configuration with a 100 nanosecond cycle, the 32-cycle refresh sequence (which is wasted time as far as the computer is concerned) would consume 3200 nanoseconds per millisecond, or an insignificant 0.32% of the total operating time.

Depending on the X address of an addressed memory cell, it may lie on bit line half 16 or on bit line half 18. The X address is conventionally arrived at by feeding binary address component signals $X_1$, $X_2$, $X_4$, $X_8$, and $X_{16}$ to a series of decoders (not shown), one for each X address. Each decoder is arranged to produce an output only in the presence of a specific combination of address component signals. Conventionally, the X addresses in the right half of a 32-column array each have an $X_{16}$ component, while those in the left half do not. Consequently, the proper selection of bit line half 16 or 18 for a given X address is readily made by applying $X_{16}$ to selection gate 44, and $\overline{X}_{16}$ to the selection gate 46.

Selection gates 44, 46 and 32 are enabled by a MOSFET whose two inputs are the WRITE and READ pulses. Continuous enabling of 44, 46 and 32 in the fashion in which cell address gates such as 34 are enabled would cause capacitive inbalances which would impair the amplifier action.

It is, of course, possible to connect the entire bit line to one side of the sense amplifier, e.g. to the junction between MOSFET's 26, 30. This would dispense with the necessity for the selection gates 44, 46. On the other hand, it would necessitate the provision of a capacitive pad connected to the junction between MOSFET's 24, 28, of a capacitance equal to the line capacitance of the bit line, to replace the line capacitance of the idle bit line half in the preferred embodiment. Also, as pointed out hereinabove, the decrease in the active bit line capacitance resulting from the splitting of the bit line makes the circuit parameters less critical.

As a slight modification to the embodiment illustrated in FIG. 1, one of the precharge transistors 24 or 26 may be eliminated and the other connected to the common point between transistors 44, 46 and 32. The timing would be modified so that $X_{16}$ and $\overline{X}_{16}$ are both enabled during $\varphi_1$ time. A transistor is eliminated by this modification.

A further modification of the embodiment illustrated in FIG. 1 involves eliminating transistor 40 and attaching transistor 42 to the common point between transistors 32, 44 and 46. A two input AND gate would be connected to the gate of transistor 42. One input to the AND gate would be the Y address, while the other input would be the WRITE pulse. Thus transistor 42 would be enabled only when the WRITE pulse and Y address pulse coincided. Transistor 32 would then perform the READ function.

I claim:

1. A MOSFET sense amplifier for sensing information-representing charge transfers to and from a memory capacitance, comprising:

(a) a pair of cross-coupled MOSFET's having a common source connection and having their gates connected to each other's drain;

(b) a pair of capacitive means each connected to the drain of one of said MOSFET's;

(c) precharge means arranged to precharge said pair of capacitive means during a first period of time to a substantially equal energy level sufficient to enable both of said MOSFET's;

(d) address means for rendering said energy levels of said capacitive means unequal following said precharge by connecting said memory capacitance to one of said capacitive means; and (e) means arranged to drive said pair of capacitive means toward ground through the source-drain circuit of said MOSFET's during a subsequent second time period, whereby said MOSFET's are caused to operate in a race mode which results in the capacitive means with the greater energy level being brought to the threshold voltage, one of said MOSFET's and the capacitive means with the lesser energy level being brought to ground.

2. A device according to claim 1, further including means for driving the one of said pair of capacitive means with the greater energy level to a predetermined potential greater than said threshold voltage while maintaining the other one of said pair of capacitive means with the lesser energy level at ground, during a subsequent third time period.

3. A device according to claim 1, further including write means operable following said precharge to override the effect of said address means by connecting said one of said capacitive means to a low-impedance data source.

4. A memory device of the capacitive storage type, comprising:

(a) an array of capacitive-storage memory cells arranged in rows having a common Y address, columns having a common X address;

(b) a plurality of bit line means, one for each row;

(c) X address means operative during clocked address pulses for connecting each of said memory cells in a selected column to the bit line means of its row; and (d) a source of first clock pulses and a source of second clock pulses; and (e) a plurality of sense amplifier means, one for each row, each including:

(i) a pair of cross-connecting MOSFET's having their drains connected to each other's gate and to capacitive means; and (ii) a pair of charging gate means connected between a source of first clock pulses and the respective drains of said cross-connected MOSFET's, and gated by said first clock pulses;

(iii) the sources of said cross-connected MOSFET's being connected to a source of second clock pulses;

(f) said bit line means being connected to the drain of one of said cross-connected MOSFET's of the sense amplifier in the same row.

5. The device of claim 4, in which said capacitive means connected to the MOSFET drain to which said bit line means is connected is the bit line capacitance.

6. The device of claim 4, in which said first clock pulses have twice the repetition rate of said second clock pulses and said address pulses, and said address pulses being immediately following alternate ones of said first clock pulses, straddle the other ones of said first clock pulses, but do not occur during said second clock pulses.

7. The device of claim 4, further comprising data input and data output means common to the entire array; and a plurality of Y address gate means, one for each row, said Y address gate means being selectively enabled during said address pulses and being connected between said data input and output means and said bit line means.

8. The device of claim 7, further comprising read gate means gated by clocked read pulses and connected between said data output means and said Y address gate means; and write gate means gated by clocked write pulses and connected between said data input means and said Y address gate means.

9. The device of claim 8, in which said read pulses occur substantially during the portion of said address pulses following the end of said alternate ones of said first clock pulses.

10. The device of claim 8, in which said write pulses occur substantially during the portion of said address pulses preceding the beginning of said alternate ones of said first clock pulses.

11. The device of claim 4, in which each said bit line means is divided into two separate halves, one half being connected to the drain of one of the cross-connected MOSFET's of its amplifier, and the other half being connected to the drain of the other cross-connected MOSFET of the same amplifier.

12. The device of claim 11, in which said capacitive means are the respective line capacitances of the two halves of the bit line means.

13. The device of claim 11, further comprising data input and output means, and bit line half selection gate means interposed between each of said bit line halves and said data input and output means, and gated, respectively, by third and fourth pulses selectively occurring coincidentally with said address pulses.

14. The device of claim 13, in which said third and fourth pulses are mutually exclusive and are component parts of all the X addresses of the cells associated with the selected bit line half.

References Cited

UNITED STATES PATENTS

| | | | |
|---|---|---|---|
| 3,292,008 | 12/1966 | Rapp | 340—173 X |
| 3,363,115 | 1/1968 | Stephenson | 307—291 X |
| 3,389,383 | 6/1968 | Burke | 340—173 |

TERRELL W. FEARS, Primary Examiner

H. L. BERNSTEIN, Assistant Examiner

U.S. Cl. X.R.

307—230, 251, 279